United States Patent [19]
Hutchinson

[11] Patent Number: 5,826,503
[45] Date of Patent: Oct. 27, 1998

[54] HEAT SEALING APPARATUS FOR PLASTIC BAGS

[75] Inventor: Harold D. Hutchinson, Oxnard, Calif.

[73] Assignee: Harwil Corporation, Oxnard, Calif.

[21] Appl. No.: 677,535

[22] Filed: Jul. 10, 1996

[51] Int. Cl.[6] .................................................. B30B 15/34
[52] U.S. Cl. ........................ 100/320; 100/326; 156/579
[58] Field of Search ........................... 100/315, 319–321, 100/326, 101; 156/579

[56] References Cited

U.S. PATENT DOCUMENTS

| | | | |
|---|---|---|---|
| 3,106,630 | 10/1963 | Klamp | 100/326 |
| 3,165,622 | 1/1965 | Marzec | 100/326 |
| 3,236,174 | 2/1966 | Hutchinson et al. | 100/319 |
| 3,721,602 | 3/1973 | Bosse | 100/320 |
| 3,779,838 | 12/1973 | Wech | 100/320 |
| 4,431,474 | 2/1984 | Gronzek et al. | 100/326 |
| 5,266,150 | 11/1993 | Miller | 100/321 |

*Primary Examiner*—Stephen F. Gerrity
*Attorney, Agent, or Firm*—David O'Reilly

[57] ABSTRACT

An improved plastic bag sealing apparatus comprised of an improved heater formed of a heating wire embedded in a silicon rubber material. The heater is shaped to conform to the flat planar surface of a T-bar shaped heating element, and clamped in place with insulators to provide maximum transfer of heat to the heating edge formed by the web portion of the T-bar. The containment of heat and transfer of maximum heat to the T-bar permits a substantial improvement in thermal efficiency and a substantial reduction of power consumption. The heating edge of the T-bar is covered with an easily replaceable heating channel coated with a non-stick, heat resistant material such as polytetraflouroethylene (TEFLON).

9 Claims, 4 Drawing Sheets

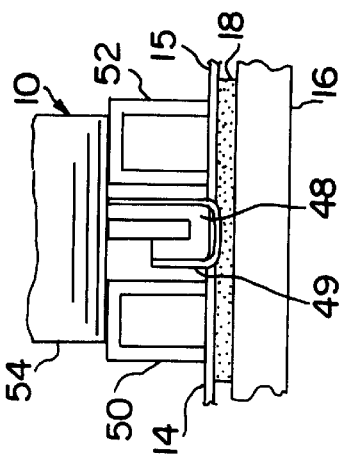
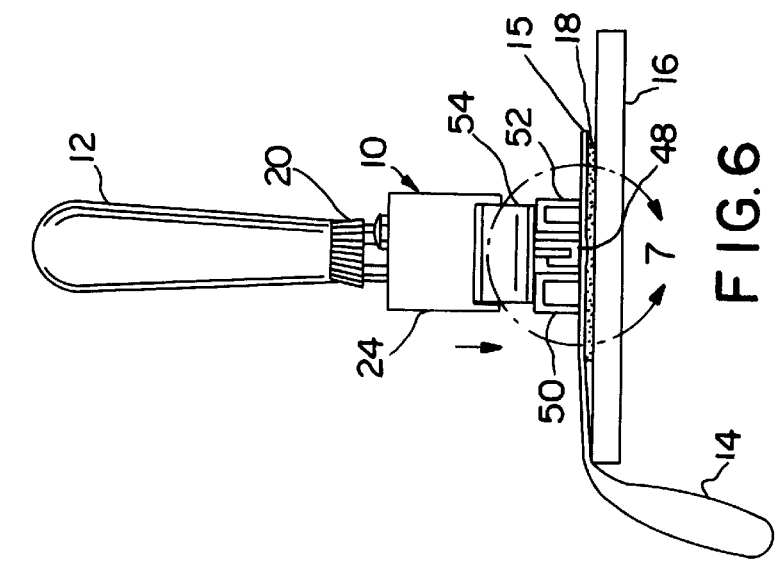
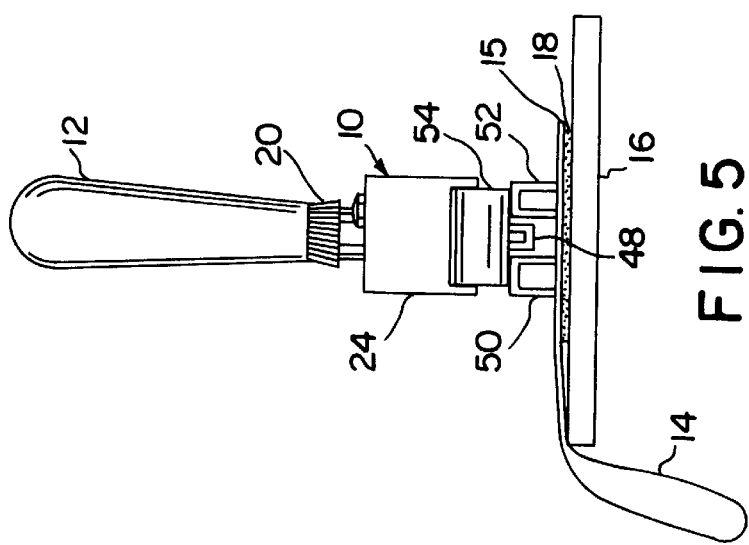
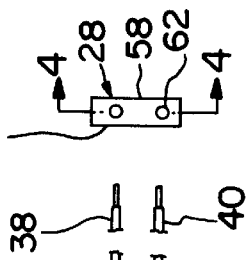
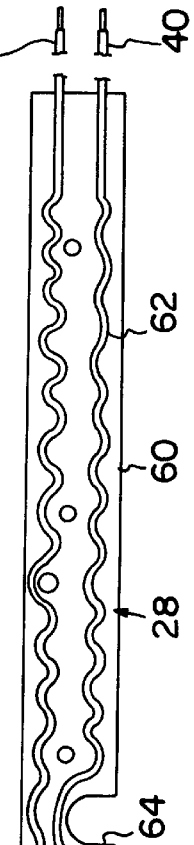

TEMP. (°F)
ΔT≈50°F
HORIZONTAL POSITION ALONG SEALING EDGE

TEMP. (°F)
ΔT≈15°F
HORIZONTAL POSITION ALONG SEALING EDGE

HEAT SEALING APPARATUS FOR PLASTIC BAGS

BACKGROUND OF THE INVENTION

1. Field of the Invention

This invention relates to a portable heat sealing apparatus for plastic bags and more particularly, relates to an improved more efficient heat sealing apparatus.

2. Background Information

Plastic bags are sealed by heating the perimeter at the opening to the bag. Heat is applied across the opening, under pressure that melts the plastic and "welds" the opening of the plastic bag. There are plastic bag heat sealers that include drawing a vacuuming then sealing the opening by applying heat to melt and weld the opening together. These devices are complicated and expensive, and have jaws that are heated to melt the plastic bag opening after a vacuum has been drawn in the bag.

There is also a plastic bag heater disclosed and described in U.S. patent application Ser. No. 3,236,174 issued Feb. 22, 1966 to Hutchinson et al, one of whom is the inventor of the invention disclosed herein. This patent discloses a portable plastic bag sealer that has a sealing edge with controlled heat to seal the plastic bag by applying pressure against the opening of the plastic bag with the bag positioned on a surface. The device disclosed is simple in construction and use, and can be operated by one hand of an operator. It provides superior seals to comparable portable apparatus that were previously available.

However, this device is somewhat thermally inefficient and can have some exposed outer hot surfaces as are typically exposed in the use of hot cloth irons. The heater is in the form of a T-bar that is heated by ceramic heating elements on either end. The heating elements must generate a considerable amount of heat energy to heat the entire T-bar to attain sufficient high temperature on the heating edge to seal the plastic bag. This results in the entire portable bag sealer becoming hot enough to degrade internal components and thus, shorten the sealers operating life. In addition, the inefficient heater requires substantial power to generate sufficient heat to seal a plastic bag.

It is therefore, one object of the present invention to provide an improved plastic bag sealer that provides more efficient heating of the sealing edge.

Yet another object of the present invention is to provide a plastic bag sealer having an improved heater that provides more uniform heat at lower power inputs.

Still another object of the present invention is to provide a plastic bag sealing apparatus, which reduces heat loss by preventing heat transfer to surrounding components and the surrounding atmosphere.

Still another object of the present invention is to provide a plastic bag sealing apparatus that allows small gauge insulation wire to be used that is less expensive and therefore, lasts longer when used at the reduced temperatures.

Yet another object of the present invention is to provide an improved plastic bag sealer having an improved heater that prevents transfer of heat to external components (e.g., the cover) thereby providing a safer sealer.

Yet another object of the present invention is to provide an improved plastic bag sealing apparatus with an improved heater that prevents insulating plastic parts from breaking down due to high operating temperatures.

Still another object of the present invention is to provide a plastic bag sealer having a silicon rubberized heater with embedded heater wires that are clamped in place by insulating plates alone or in conjunction with fiberglass insulation.

Still another object of the present invention is to provide a plastic bag sealing apparatus having an improved heater that provides greater heat transfer to the T-bar edge, and less heat transferred to structural components.

Yet another object of the present invention is to provide a plastic bag sealing apparatus having an improved flat silicon sheet heater having embedded heating wires that provide uniform heating over the entire length and width of the T-bar heater.

Yet another object of the present invention is to provide an improved plastic bag sealer having an improved heater utilizing thermally insulating standoffs that assists in reducing transfer of heat to surrounding components and external surfaces.

BRIEF DESCRIPTION OF THE INVENTION

The purpose of the present invention is to provide an improved portable plastic bag sealing apparatus that is more efficient and user friendly than the model disclosed in the above identified patent.

The plastic bag heat sealing apparatus of the present invention is constructed of a T-shaped (i.e., T-bar) heating element providing a sealing edge that is covered with a replacable channel having a non-stick, heat resistant and durable plastic coating such as polytetraflouroethylene (TEFLON). The TEFLON coating on the channel is effective to prevent the sealing apparatus from sticking to the plastic material. The top of the T-shaped heater is heated by an improved heater comprised of resilient material having an integral heating wire. The resilient heater covers the entire surface on the top of the T-bar heating element, and is clamped in place with an insulator. A pair of rails on either side of the heating edge of the T-bar are attached by means of leaf springs that allow the heating edge to pass through a slot formed by the rails to heat a plastic bag positioned on a non-stick surface. The heating assembly is enclosed in a housing which has a centrally located handle used to press the heater down when sealing a plastic bag.

A thermostat is provided to vary the temperature of the hot sealing edge applied to the plastic bar. The thermostat allows adjusting of the heat intensity according to the thickness of the plastic bags being sealed. Three different settings are provided. The first setting is for plastic bags or films from one to two mils thick. The second setting is for medium bags or films three to four mils thick. A third setting for thicker bags having plastic material that is six to ten mils thick is provided.

The resilient heater is preferably a rectangular shape of soft silicon material having a heating wire encapsulated in the material. The heating wire is incorporated in the material in a winding path along one side, and winds back along the other side. This provides uniform and even heating over the entire heater and high heat transfer to the T-bar heating element. This results in more uniform heating and lower power to achieve temperatures that provide an efficient seal.

The resilient heating element is also clamped in place, on top of the T-bar heater, and cuts stray heat loss by as much as fifty percent (50%) substantially reducing input power. The reduction in heat transfer to the surrounding components prevents cracking and damage to the components due to mechanical shock loads during rough handling.

The above and other novel features of the invention will be more fully understood from the following detailed description and the accompanying drawings, in which:

BRIEF DESCRIPTION OF THE DRAWINGS

FIG. 3 is an end view of the resilient heater having an embedded heater wire.

FIG. 4 is a sectional view of an improved resilient heater illustrating the heating wire configuration.

FIG. 5 illustrates the plastic bag heat sealing apparatus positioned for sealing a plastic bag.

FIG. 6 illustrates the plastic bag heat sealing apparatus sealing a plastic bag.

FIG. 7 is an enlarged view illustrating operation of the plastic bag heat sealer taken at 7 of FIG. 6.

DETAILED DESCRIPTION OF THE INVENTION

Figure 1:
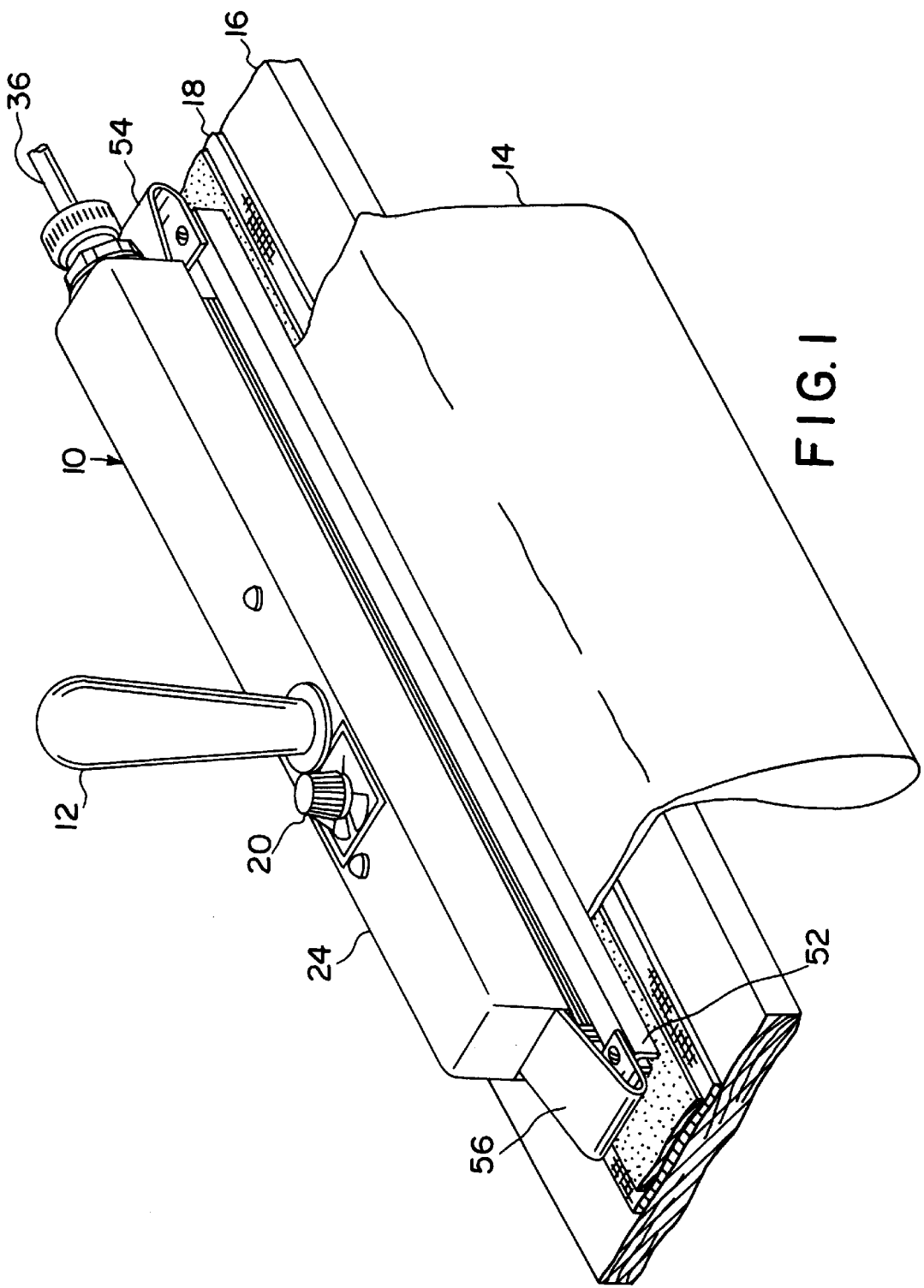
FIG. 1 is a isometric view of an improved plastic bag sealing apparatus according to the invention.

A plastic bag sealer is shown in the isometric view of FIG. 1, and is similar in design to the sealing apparatus disclosed and described in U.S. Pat. No. 3,236,174 issued Feb. 22, 1966 to Hutchinson et al. The plastic bag sealer 10 has a handle 12 for one-hand operation in sealing a plastic bag 14 lying on a table 16, or other suitable surface which includes a pad or mat 18. The temperature of sealer 10 is controlled by knob 20 which controls a thermostat as will be described in greater detail hereinafter. The operator grasps plastic bag sealer 10 by handle 12, and presses it down firmly against pad 18, on plastic pad 14. A sealing edge heats, melts thereby, seals the opening of plastic bag 14, as will be described in greater detail hereinafter.

Figure 2:
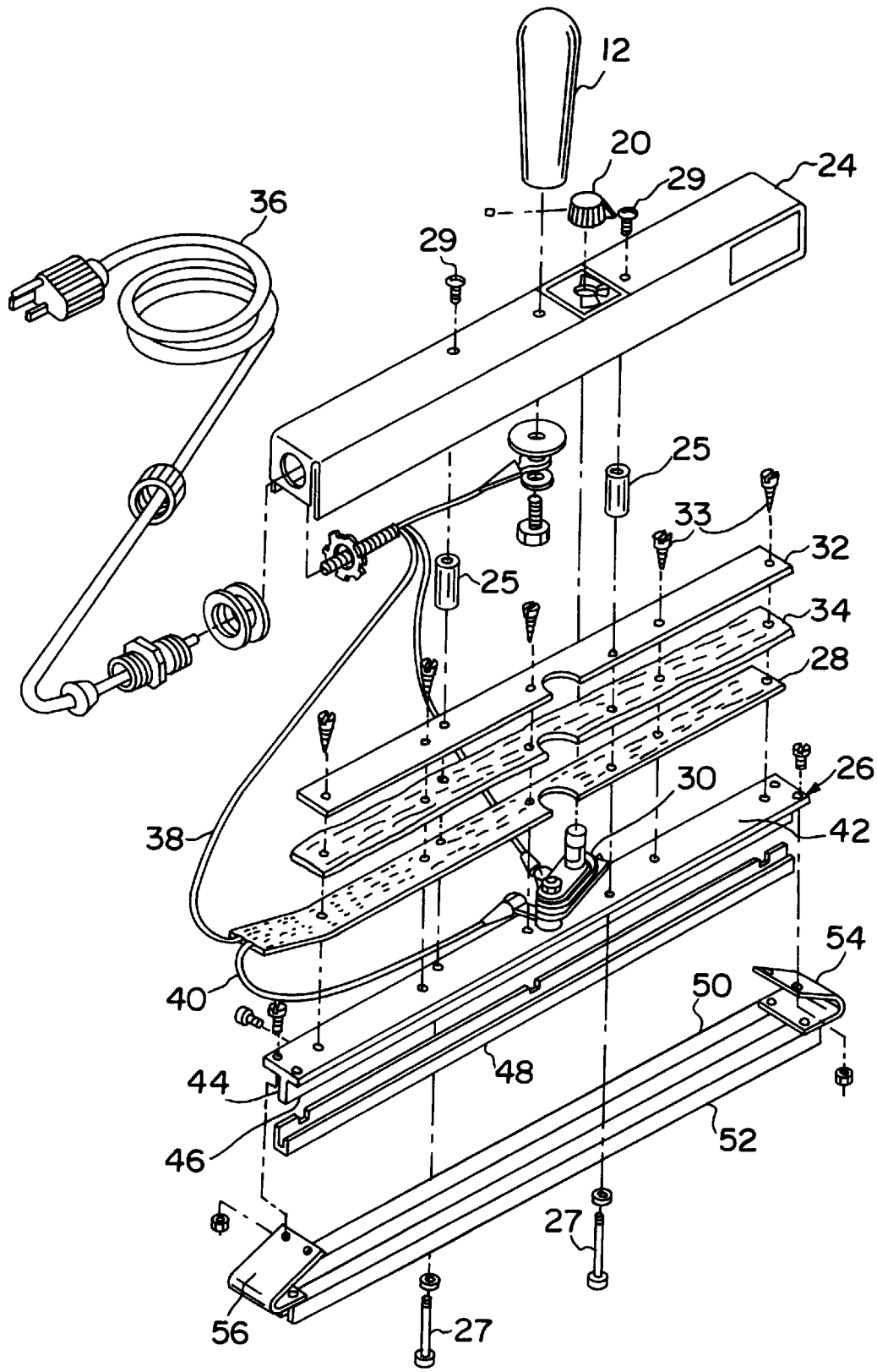
FIG. 2 is an exploded view of the heat sealing apparatus of FIG. 1.

The construction of plastic bag sealer 10 is shown in exploded view of FIG. 2. Plastic bag sealer 10 has a handle 12 as previously described; and a housing or cover 24, covering a heating element 26, heater 28, thermostat 30 and insulators 32 and 34. Plastic bag sealer 10 is connected to electrical power with cord 36. The construction and operation of plastic bag sealer 10 substantially reduces power consumption and the transfer of heat to surrounding components, allowing smaller gauge wires 38 and 40 to be used without the heavy insulation heretofore required.

Heating element 26 is in the shape of a T-bar having a flat upper surface 42, and a vertical centrally located web 44, providing a heating edge 46, covered by replaceable heating channel 48 having a heat resistant, non-stick coating 49 of TEFLON (polytetraflouroethylene) (FIG. 7). Heating element 26 is heated by rubberized silicon heater 28, as will be described in greater detail hereinafter. Heating channel 48, covering heating edge 46, remains in a normal retracted position (FIG. 5) in housing or cover 24, between rails 50 and 52, attached to upper surface 42 of heating element 26 by leaf springs 54 and 56.

Heater 28 is securely clamped, covering the entire planar surface by Micarta insulator 32, held in place by screws 33. An additional fiberglass insulator 34 may be clamped between insulator 32 and heater 28 if desired. The uniform construction and heating of heater 28 allows transfer of almost all heat to heating element 26 and heating edge 46 with heat loss and transfer to other components being minimized. Housing or cover is insulated from heating element by ligonite standoffs 25 of impregnated wood mounted by screws 27 below and screws 29 above. This keeps cover 24 from any contact with heated surfaces.

The construction of heater 28 is shown in greater detail in FIGS. 3 and 4. Heating element 28 is comprised of rubber or silicon sheets 58 and 60 having a heating wire 62 embedded between the silicon rubberized sheets 58 and 60.

The heater 28 is shown in FIG. 4 with upper silicon rubber sheet 58 removed for clarity. Heating wire 62 traverses a circuitous path down and along one edge of rectangular silicon rubberized sheet 60 to the opposite end and then back the other, and is connected to power cord 36 by wires 38 and 40. This arrangement provides uniform heating over the entire length of heater 28. Slot 64 is provided to fit around thermostat 30, which controls the heat applied through knob 20. Thermostat 30 is preferably a short shaft model (MOD HP-84 or equivalent) bi-metal thermostat manufactured by Bimet Corporation of Morris, N.J.

The application of the device, to seal a plastic bag, is illustrated in FIGS. 5 through 7. Plastic bag 14 is placed on a suitable pad or mat 18, on a flat surface such as a table 16. Plastic bag heat sealer 10 is then placed over plastic bag 14, near the opening 15 with rails 50 and 52 resting on plastic bag 14 and heating element 26 retracted. With the appropriate amount of heat set by knob 20, plastic bag sealer 10 is pressed downward with handle 12 allowing TEFLON coated heating edge 48 to compress bag 14, heating it until it melts and welds the plastic closed as illustrated in FIG. 7. When handle 12 is released, leaf springs 54 and 56 retract heating edge 48 into housing 24 ready to seal the next plastic bag. Another plastic bag 14 is then placed on mat 18, and the process is repeated. Each plastic bag can be sealed in just a second or two.

Thermostat 30 is adjusted by knob 20 to accommodate materials of different thicknesses. Preferably, three settings are provided. A first setting is for thin bags or plastic films from one to two mils thick. A second setting, at a slightly higher temperature, is provided for bags and films from three to four mils thick. A third and highest setting is provided for thick bags and films from six to ten mils thick. The thinnest bags will seal in approximately one second, with the thicker bags in the range of three to ten mils thick, will seal in one and one-half to two seconds.

Figure 8A:
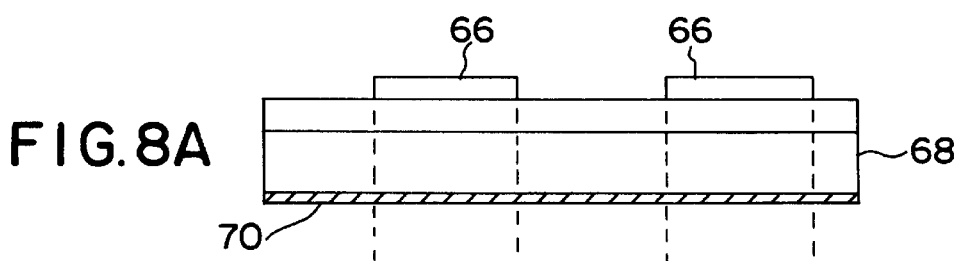
FIGS. 8a through 8d illustrate the improved uniform heat transfer and uniform temperature profile of the new resilient silicone heater versus the old single point isolated ceramic heaters.
Figure 8B:
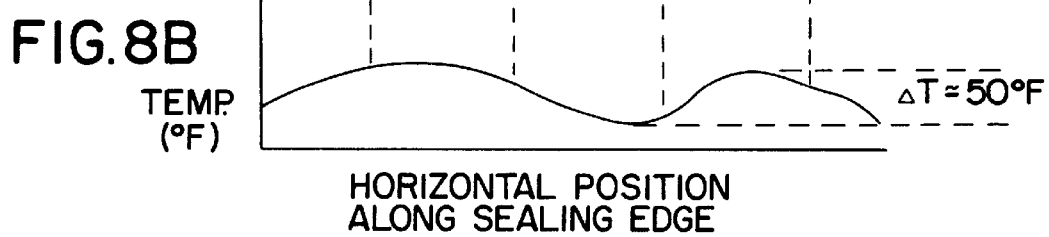
Figure 8C:
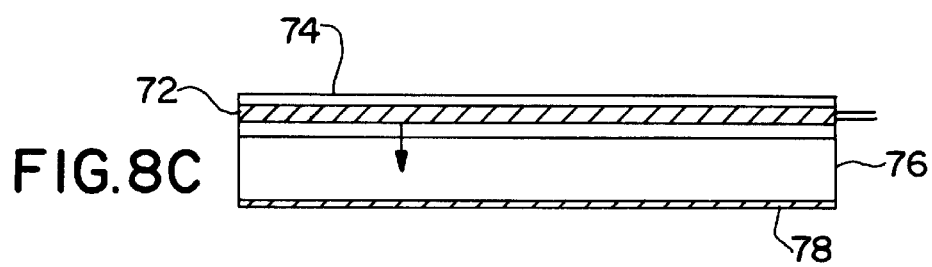
Figure 8D:
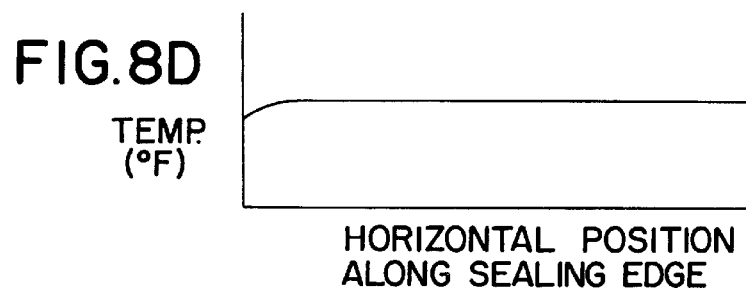

FIGS. 8a through 8d are diagrams that illustrate the improved performance from the uniform heat transfer and uniform temperature profile of the resilient embedded heater versus the old type heater using single point ceramic heaters. FIGS. 8a through 8b diagrammatically illustrate the inefficient operation of the isolated ceramic heaters. Isolated ceramic heaters 66, spaced apart on T-bar 68, transfer heat to coated sealing edge 70 which when pressed down, produce the heating profile shown in FIG. 8b. Note, that the temperature gradient varies substantially (i.e., approximately 50° F.) in the areas directly beneath ceramic heaters 66. Thus, considerable heat is needed to assure a seal along the entire width of the plastic bag.

In contrast, the improved plastic bag sealer provides a more efficient transfer of heat to seal a plastic bag. Uniform resilient heater 72, securely clamped by insulating clamp 74, uniformly transfers heat to T-bar 76 and coated heating edge 78. The improved portable plastic bag sealer with the uniform resilient heater produces the heating profile shown in FIG. 8d. The resilient heater produces a uniform heat transfer and uniform temperature gradient that varies less than about 15° F. beneath the entire sealing edge 78. Since the heat transfer is relatively uniform over the area being sealed, lower heat temperatures can be used, a more uniform seal is produced and the plastic bag sealer has less heat transfer to external surfaces making it safer.

Thus, there has been described a plastic bag sealer, with substantial improvements over the plastic bag sealer disclosed and described in the U.S. Pat. No. 3,236,174 referred to hereinabove. The plastic bag sealer is provided with a soft silicon heater comprised of a heating wire embedded in the silicon rubber. Heating temperatures and transfer of heat to surrounding components is substantially reduced. A reduction of up to fifty percent (50%) in power consumption to achieve the same heating temperature is achieved. The sealing edge channel is preferably TEFLON coated, and is easily replaced on the heating element. Improved heat transfer is provided by an aluminum T-bar heating element having an easily replaced thin aluminum channel having a TEFLON coating. An improved sealing edge and reduction in sticking of the material can be provided by occasionally wiping the edge of the aluminum sealing channel with a rag impregnated with silicon oil. The plastic bag sealer quickly and easily seals plastic bags placed on a back-up mat, providing a good seal with limited shrinkage.

This invention is not to be limited by the embodiment shown in the drawings and described in the description which is given by way of example and not of limitation, but only in accordance with the scope of the appended claims.

What is claimed is:

1. A heat sealing apparatus for plastic materials comprising;

a T-shaped heating element having an upper planar surface and a flange perpendicular to the planar portion forming a heating edge;

a resilient planar heater covering the upper planar surface of the T-shaped heating element;

clamp means firmly clamping said resilient planar heater on top of the T-shaped heating element;

said resilient planar heater having an embedded heating wire shaped and spaced to provide uniform heating of said T-shaped heating element;

a housing covering said T-shaped heating element and said resilient planar heater;

a handle on said housing for pressing said heating apparatus downward against a surface;

a pair of rails mounted on either side of said heating edge forming a slot through which said heating edge may pass;

biasing means biasing said rails over and beyond the end of said heating edge to maintain said heating edge in a retracted position until ready to use;

means connecting said resilient planar heater to electrical power to heat said heating element and heating edge;

whereby when said heat sealing apparatus is pressed downward on a plastic material placed on a surface, said heating edge passes through said slot between said rails and heats and seals said plastic material.

2. The apparatus according to claim 1 including a replaceable heating sealing channel mounted over and covering said heating edge of said T-shaped heating element.

3. The apparatus according to claim 2 wherein said replaceable heat sealing channel is coated with a heat resistant non-stick coating.

4. The apparatus according to claim 3 in which said heat resistant, non-stick coating is polytetraflouroethylene.

5. The apparatus according to claim 1 in which said clamping means comprises an insulator having the same shape as said resilient planar heater securely fastened to said T-shaped heating element on top of said heater.

6. The apparatus according to claim 5 including insulating fiberglass beneath said insulator.

7. The apparatus according to claim 6 including attaching said heating element to said housing with impregnated wood standoffs to minimize heat transfer to said housing.

8. The apparatus according to claim 1 wherein said resilient planar heater comprises a heating element embedded in a resilient elastomer.

9. The apparatus according to claim 8 wherein said resilient elastomer is a silicone elastomer.

* * * * *